United States Patent
Cheio De Oliveira et al.

(10) Patent No.: US 11,291,960 B2
(45) Date of Patent: Apr. 5, 2022

(54) MEMBER FOR KNEADING DOUGH AND KNEADING DEVICE COMPRISING SUCH A MEMBER

(71) Applicant: VMI, Montaigu Vendee (FR)

(72) Inventors: José Cheio De Oliveira, St Hilaire de Loulay (FR); Emmanuel Chaillou, Le Fenouiller (FR); Jessica Mille, Bouffere (FR); Nicolas Paugam, Fontenay le Comte (FR)

(73) Assignee: VMI, Montaigu Vendee (FR)

( * ) Notice: Subject to any disclaimer, the term of this patent is extended or adjusted under 35 U.S.C. 154(b) by 110 days.

(21) Appl. No.: 16/633,692

(22) PCT Filed: Jul. 20, 2018

(86) PCT No.: PCT/FR2018/051871
§ 371 (c)(1),
(2) Date: Jan. 24, 2020

(87) PCT Pub. No.: WO2019/020914
PCT Pub. Date: Jan. 31, 2019

(65) Prior Publication Data
US 2020/0222866 A1    Jul. 16, 2020

(30) Foreign Application Priority Data
Jul. 26, 2017   (FR) ..................................... 17/57099

(51) Int. Cl.
*A21C 1/02*   (2006.01)
*A21C 1/14*   (2006.01)
(Continued)

(52) U.S. Cl.
CPC ............ *B01F 7/00325* (2013.01); *A21C 1/02* (2013.01); *A21C 1/1405* (2013.01);
(Continued)

(58) Field of Classification Search
CPC . A21C 1/02; A21C 1/1405; B01F 2215/0011; B01F 2215/0422; B01F 7/00325; B01F 7/00408; B01F 7/1605
See application file for complete search history.

(56) References Cited

U.S. PATENT DOCUMENTS 841,296   A  *   1/1907   Woodruff ................. A21C 1/02
                                                        366/98
4,522,503 A  *   6/1985   Salter ....................... A21C 1/02
                                                        366/287
(Continued)

FOREIGN PATENT DOCUMENTS

DE   102012216206 A1   3/2014
EP       0551571 A1   7/1993
(Continued)

OTHER PUBLICATIONS

English Machine Translation to Abstract DE102012216206.
(Continued)

*Primary Examiner* — Tony G Soohoo
(74) *Attorney, Agent, or Firm* — Cantor Colburn LLP

(57) ABSTRACT

The present invention relates to a kneading member (107) for a device for kneading a dough, comprising: —a mounting disc (109); —a kneading tool (111) for mixing the ingredients which constitute a dough, comprising: —an upper portion (121), extending from said mounting disc, —a mid-portion (123), in the extension of said upper portion, and —a lower portion (125), in the extension of said mid-portion. The kneading member (107) according to the invention is noteworthy in that the kneading tool (111) consists of a circular helix, the angle of winding of which is non-constant between said upper, mid- and lower portions of the tool (111) and in that the angle of winding of the lower portion (125) is less than that of the mid-portion (123). The (Continued)

invention also relates to a kneading device fitted with such a kneading member.

15 Claims, 3 Drawing Sheets

(51) Int. Cl.
    *B01F 7/16*     (2006.01)
    *B01F 7/00*     (2006.01)

(52) U.S. Cl.
    CPC ........ *B01F 7/00408* (2013.01); *B01F 7/1605* (2013.01); *B01F 2215/0011* (2013.01); *B01F 2215/0422* (2013.01)

(56) References Cited

U.S. PATENT DOCUMENTS

| | | | | |
|---|---|---|---|---|
| 5,000,578 A | * | 3/1991 | Artin | A47J 43/082 366/100 |
| 5,779,360 A | * | 7/1998 | Tanaka | B01F 7/161 366/286 |
| 5,906,432 A | * | 5/1999 | Wade | B01F 7/30 366/97 |
| 6,533,448 B1 | * | 3/2003 | Drocco | A21C 1/02 366/306 |
| 6,652,137 B1 | * | 11/2003 | Bosch | B01F 7/00291 366/288 |
| 7,021,817 B2 | * | 4/2006 | Huang | A47J 43/082 366/331 |
| D795,641 S | * | 8/2017 | Spencer | D7/412 |
| 2003/0053368 A1 | | 3/2003 | Drocco | |

FOREIGN PATENT DOCUMENTS

| | | | | |
|---|---|---|---|---|
| EP | 1661461 A1 | * | 5/2006 | ........... A21C 1/1485 |
| EP | 1661461 A1 | | 5/2006 | |
| GB | 2046113 A | * | 11/1980 | .......... B01F 7/00325 |

OTHER PUBLICATIONS

International Search Report for Application No. PCT/FR2018/051871.
Written Opinion for Application No. PCT/FR2018/051871.

* cited by examiner

MEMBER FOR KNEADING DOUGH AND KNEADING DEVICE COMPRISING SUCH A MEMBER

CROSS REFERENCE TO RELATED APPLICATIONS

This application is a National Stage of PCT Application No. PCT/FR2018/051871 filed on Jul. 20, 2018, which claims priority to French Patent Application No. 17/57099 filed on Jul. 26, 2017, the contents each of which are incorporated herein by reference thereto.

TECHNICAL FIELD

The present invention relates to the field of industrial bakery/pastry, and concerns a kneading member for a device for kneading a dough and a dough kneading device including such a kneading member.

BACKGROUND

As is known per se, the making of a bakery dough includes several successive steps. The main steps of making such a dough before baking are the following ones:
the milling: a step which consists in mixing the ingredients that compose the dough in the vessel of a kneading device such as a kneader;
the kneading: a step which consists in texturing the dough by developing the protein network of the dough. The development of the protein network is obtained by applying a mechanical force on the dough formed during the milling in order to obtain a homogenization of the ingredients that compose the dough;
the fermentation of the dough.

A kneading device 1 known from the prior art and represented in FIG. 1 includes a frame 3 on which a vessel 5 is mounted, fixed or rotatable on the frame, intended to receive the ingredients that compose the dough, a motor, adapted to drive in rotation two kneading members 7 immersed in the vessel and designed to mix said ingredients.

The kneading members of the prior art may have a rectilinear or slightly curved shape as represented in FIG. 1.

The geometry of these members allows obtaining a good incorporation of each ingredient constituting the mixture.

Indeed, providing rectilinear or slightly curved kneading members 7 allows properly collecting the ingredients which tend to accumulate in the bottom of the vessel 5.

Nonetheless, the kneading member working under shear, the dough tends to be cut, which leads to a breaking of the protein networks during the fermentation.

In addition, the working under shear of the dough affects the elasticity of the dough. The poor elasticity of the dough can lead to fermentation problems and therefore in the final product.

In order to obtain a better texturing of the dough, it is known to use spiral shaped kneading members.

A kneading device 10 of the prior art equipped with spiral shaped kneading members 17 is represented in FIG. 2.

The helical shape of these members improves the rheological behavior of the dough.

However, when the kneading is carried out by means of kneading members having a helical shape, some ingredients are more difficult to scatter at the bottom of the vessel.

This is in particular the case when sugar is incorporated into the mixture: the sugar tends to accumulate in the bottom of the vessel 15, and the helical kneading member in rotation in the vessel spreads the sugar on the bottom of vessel.

BRIEF SUMMARY

The present invention aims at overcoming the drawbacks of the prior art. To this end, it aims at providing a kneading member which leads to a good incorporation of the ingredients that constitute the dough and which allows for a good texturing of the dough.

To this end, the present invention concerns a kneading member for a kneading device for kneading a dough, said kneading member comprising:
a mounting roller, adapted to be rotated via a motor of the kneading device;
a kneading tool, intended to be at least partially immersed in a mixing and kneading vessel of the kneading device and designed to mix ingredients that constitute a dough, said kneading tool comprising:
an upper portion, extending from said mounting roller,
a middle portion, in the continuation of said upper portion, and
a lower portion, in the continuation of said middle portion, one end of which consists of a lower edge of the kneading tool,
said kneading member being remarkable in that the kneading tool consists of a circular helix blade whose winding angle is not constant at least between said upper, middle and lower portions of said kneading tool, and in that the winding angle of the lower portion of said kneading tool is smaller than that of the middle portion of said kneading tool.

Thus, by providing a kneading member whose kneading tool consists of a circular helix blade, whose winding angle is not constant between the upper, middle and lower portions of the kneading tool, and whose winding angle of the lower portion of the kneading tool is smaller than that of the middle portion of said kneading tool, it is possible to obtain both a good mixing quality of the ingredients that compose the dough and a good texturing of the dough.

Indeed, providing a winding angle of the lower portion of the tool smaller than that of the middle portion of the tool enables the lower portion of the tool to properly collect the ingredients that compose the dough and which tend to accumulate in the bottom of the vessel. The quality of mixing the dough is thus improved in comparison with that obtained in the prior art with a spiral shaped tool.

In addition, having a winding angle of the middle portion of the tool larger than that of the lower portion of the tool allows obtaining a good texturing of the dough because the helical shape improves the rheological behavior of the dough. The quality of texturing the dough is thus improved in comparison with that obtained in the prior art with a rectilinear or slightly curved tool.

According to optional features of the kneading member of the invention:
the value of the winding angle formed by the upper and middle portions of the kneading tool is comprised between about 85% and about 95% of the value of the total winding angle of the kneading tool, and the value of the winding angle formed by the lower portion of the kneading tool is comprised between about 5% and about 15% of the value of the total winding angle of the kneading tool;
the upper and middle portions of the kneading tool extend over a height comprised between about 70% and about 75% of the total height of the kneading tool, and the lower portion of the kneading tool extends over a height comprised between about 25% and about 30% of the total height of the kneading tool, said height being measured between a reference plane containing an upper wall of the mounting roller and a plane parallel to said reference plane and offset relative to said reference plane towards the lower edge of the kneading tool;

the winding angle of the kneading tool decreases from the middle portion of said tool down to the lower portion of said tool;

the winding angle of the upper portion of the kneading tool and the winding angle of the lower portion of said tool are constant, and the winding angle of the middle portion of said tool is not constant;

the winding angle of the kneading tool is decreasing over the middle portion of said tool;

the winding angle of the lower portion of the kneading tool is smaller than or equal to half the smallest winding angle value of the middle portion of said tool;

the winding angle of the kneading tool is larger than or equal to 220°, the winding angle of the lower portion of the kneading tool is comprised between about 15° and about 25°;

the total winding angle of the upper portion of the kneading tool and of the middle portion of said tool is comprised between about 195° and about 205°;

The present invention also concerns a device for kneading a dough including a frame, said frame supporting:

a mixing and kneading vessel, a motor, and at least one kneading member according to the invention, rotated via said motor and whose kneading tool of said kneading member is at least partially immersed in said mixing and kneading vessel.

BRIEF DESCRIPTION OF THE DRAWINGS

Other features and advantages of the invention will appear on reading the following detailed description for the understanding of which reference will be made to the appended drawings in which.

DETAILED DESCRIPTION

In all Figures, identical or similar references represent identical or similar members or sets of members.

Figure 1:
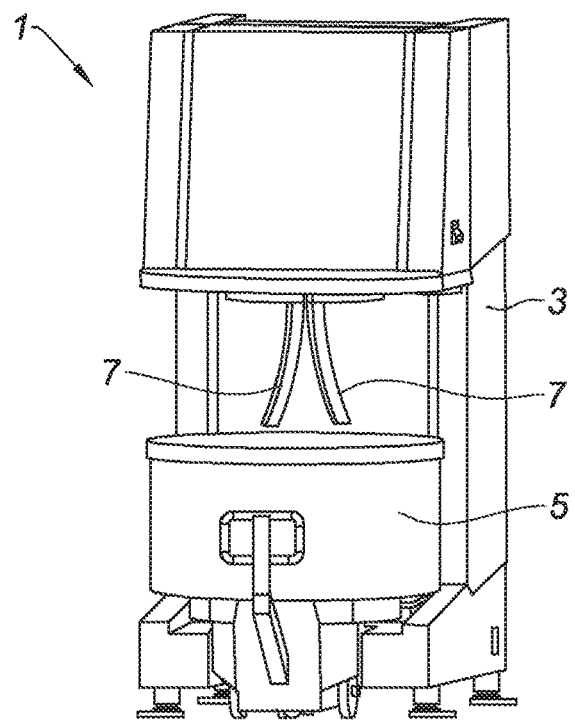
FIG. 1 represents a kneading device according to a first embodiment of the prior art.
Figure 2:
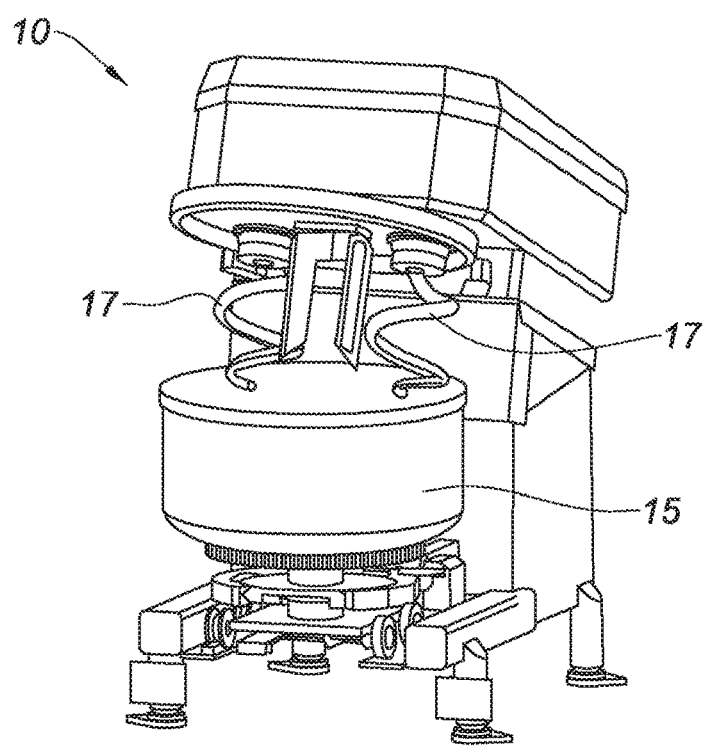
FIG. 2 illustrates a kneading device according to a second embodiment of the prior art.
Figure 3:
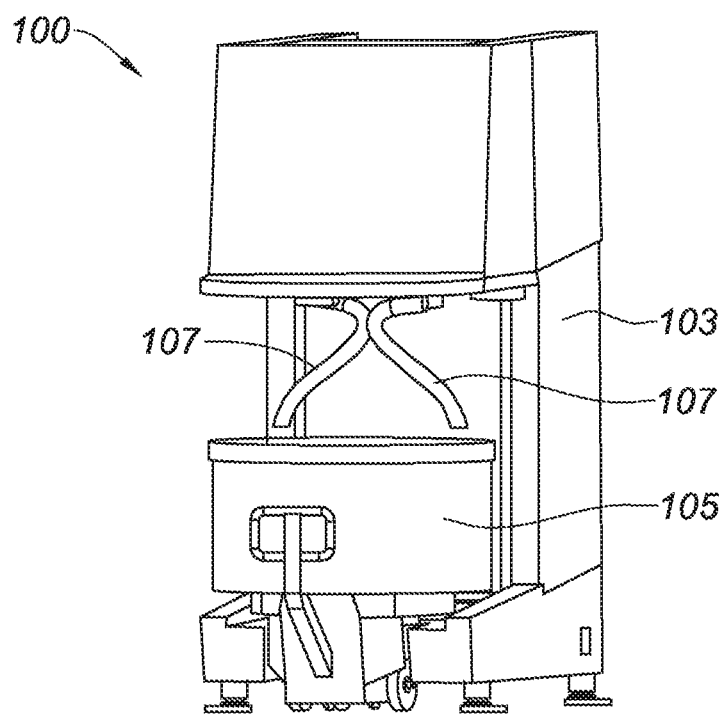
FIG. 3 represents a kneading device according to the invention.

Reference is made to FIG. 3 illustrating a kneading device 100 according to the invention.

The device 100 for kneading a dough includes a frame 103. The frame 103 supports a mixing and kneading vessel 105 intended to receive the ingredients that compose the dough to be mixed and kneaded.

In a known manner, the vessel 105 may be fixed on the frame 103 or it may be mounted in rotation on the frame 103.

The vessel may for example have a substantially cylindrical shape.

The frame 103 further supports a motor (not shown) adapted to drive in rotation a set of kneading members 107 according to the invention.

The kneading members 107 are at least partially immersed in the mixing and kneading vessel 105, this in order to enable the mixing of the ingredients composing the dough, and the kneading of the dough.

For example, two kneading members 107 may be mounted on the motor of the kneading device. Of course, the kneading device may include one single kneading member 107, or more than two kneading members.

The two kneading members 107 equipping the kneading device of the invention are identical. The kneading member 107 of the invention will be described in detail with reference to FIGS. 4 to 6.

Figure 4:
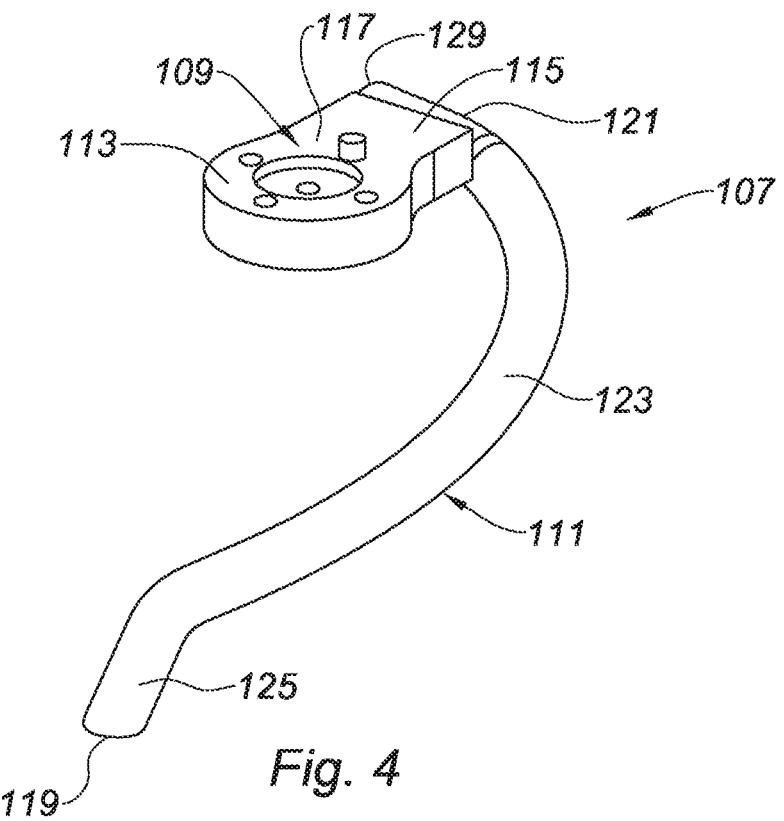
FIG. 4 illustrates the kneading member of the invention in isometric view.

Reference is made to FIG. 4 illustrating the kneading member 107 of the invention in isometric view.

The kneading member includes a mounting roller 109 and a kneading tool 111.

The mounting roller 109 is positioned in the upper portion of the kneading member 111 when the kneading member is mounted on the motor of the kneading device.

The mounting roller 109 is designed to ensure the fastening of the kneading member 107 on the motor of the kneading device 100.

The mounting roller 109 adopts for example a substantially planar shape. It includes a circular portion 113 followed by an extension 115 connecting the circular portion 113 to the kneading tool 111.

The kneading tool 111 constitutes the portion of the kneading member which comes into contact with the ingredients composing the dough to be mixed and kneaded.

The kneading tool is obtained from a material designed to mix the ingredients that constitute the dough such as, for example, a stainless steel.

In order to enable the kneading tool 111 to come into contact with the dough to be mixed and kneaded when the kneading member is mounted on the kneading device, the kneading tool 111 is relatively long. Its height H (represented in FIG. 6) is for example comprised between about 450 millimeters and about 500 millimeters. Preferably, the height of the tool is in the range of 477.50 millimeters.

The height of the kneading tool 111 is measured between a reference plane P (represented in FIG. 6) containing an upper wall 117 of the mounting roller 109 and a plane P' (represented in FIG. 6) parallel to said reference plane and passing through a lower edge 119 of the kneading tool 111.

Preferably, the cross-section of the kneading tool 111 is constant over the entire height H of the kneading tool.

The shape of the cross-section of the kneading tool 111 is preferably circular. Of course, other section shapes may be retained, such as for example a triangular, rectangular, square, trapezoidal, elliptical shaped section.

When the kneading tool 111 has a circular section, its diameter is, for example, comprised between about 25 millimeters and about 75 millimeters. Preferably, its diameter is in the range of 50 millimeters.

The kneading tool 111 comprises an upper portion 121, extending from the mounting roller 109. The upper portion 121 is followed by a middle portion 123 in the continuation of the upper portion 121.

In turn, the middle portion 123 is followed by a lower portion 125 in the continuation of the middle portion 123.

The end of the lower portion 125 is constituted by the lower edge 119. The term «end of the lower portion» means the free end of the lower portion 125, that is to say the end of the kneading tool which is not directly located in the continuation of the middle portion 123 of the tool 111.

According to the invention, the upper 121, middle 123 and lower 125 portions of the kneading tool 111 consist of a circular helix blade whose winding angle is not constant between the upper, middle and lower portions that is to say that the winding angle of the upper portion 121 of the tool 111 is different from the winding angle of the middle portion 123 of the tool, and the winding angle of the middle portion 123 of the tool is in turn different from the winding angle of the lower portion 125 of tool 111.

According to the invention, the winding angle of the lower portion 125 of the kneading tool 111 is smaller than that of the middle portion 123 of the tool.

This enables the lower portion 125 of the tool to properly collect the ingredients that compose the dough and which tend to accumulate in the bottom of the vessel, while obtaining a good texturing of the dough thanks to the winding angle of the upper tool at the level of its middle portion 123 in comparison with the winding angle provided at the level of its lower portion 125.

Figure 5:
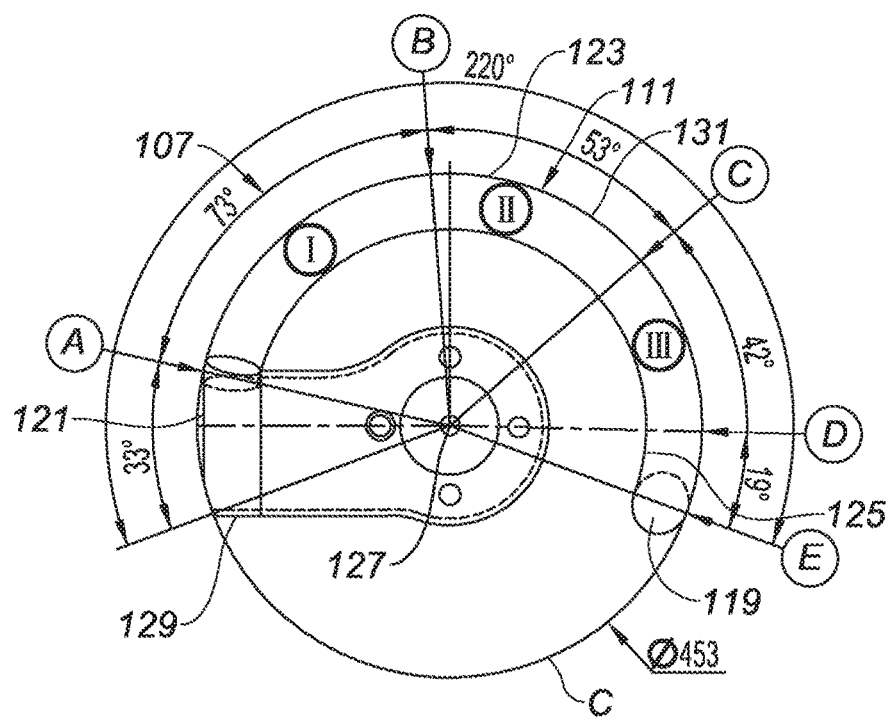
FIG. 5 is a top view of the kneading member of FIG. 4.
Figure 6:
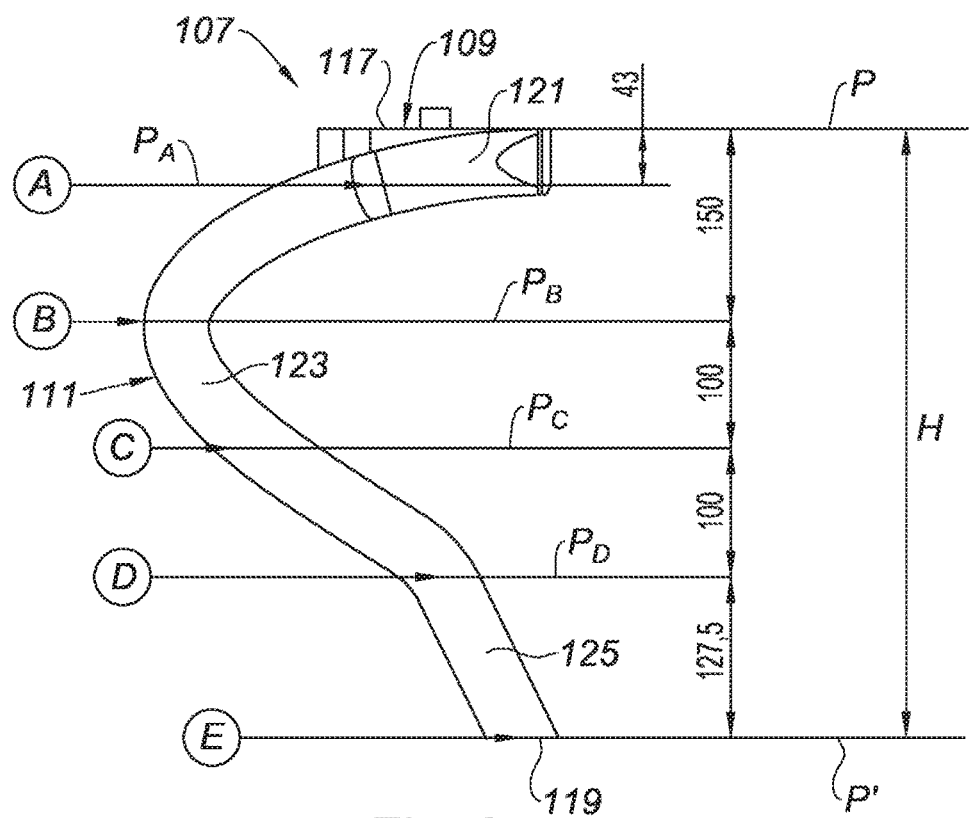
FIG. 6 is a side view of the kneading member of FIG. 4.

Reference is made to FIGS. 5 and 6, representing the kneading member 107 respectively in top view and in side view.

Referring to FIG. 5 representing the kneading member 107 in top view, the winding angle of the kneading tool 111 is defined by the angle formed by the kneading tool 111 about an axis of rotation 127 of the kneading member when the kneading member is mounted on the motor of the kneading device, between an upper edge 129 at the end of the upper portion 121 of the tool 111 and the lower edge 119 at the lower end of the lower portion 125 of the tool.

The kneading tool fits entirely into an imaginary cylinder C whose axis of the cylinder corresponds to the axis of rotation 127, and the radius of said cylinder is defined by the line segment comprised between the axis of rotation 127 of the tool and an external edge 131 of the tool.

According to a feature of the invention, the winding angle of the kneading tool 111 is at least equal to 220°. Nonetheless, it may be considered to provide a winding angle of the tool larger than 220°.

Preferably, when the winding angle of the kneading tool is equal to 220°, the winding angle of the lower portion 125 of the kneading tool is comprised between about 15° and about 25°. According to an embodiment of the kneading tool 111, the winding angle of the lower portion 125 of the kneading tool is equal to about 19°.

Similarly, the total winding angle of the upper portion 121 of the kneading tool 111 and of the middle portion 123 of the tool is comprised between about 195° and about 205°. According to an embodiment of the kneading tool 111, the total winding angle of the upper portion 121 of the kneading tool 111 and of the middle portion 123 of the tool is equal to about 201°.

In any case, in order to obtain good properties both of mixing the ingredients composing the dough and of texturing the dough, the value of the winding angle formed by the lower portion 125 of the kneading tool 111 is preferably comprised between about 5% and about 15% of the value of the total winding angle of the tool. The upper 121 and middle 123 portions of the kneading tool 111 define, in turn, a winding angle value comprised between about 85% and about 95% of the value of the total winding angle of the kneading tool.

According to a feature of the invention, the winding angle of the upper portion 121 and the winding angle of the lower portion 125 of the kneading tool 111 are constant whereas the winding angle of the middle portion 123 of the tool 111 is not constant.

Indeed, as represented in FIG. 5, the upper portion 121 of the tool 111 has for example a winding angle equal to 33° and the lower portion 125 of the tool 111 has for example a winding angle equal to 19°, whereas the middle portion 123 of the tool 111 has a winding angle equal to 73° over a first section I, then equal at 53° over a second section II, then equal to 42° over a third section III.

According to another feature of the invention also shown in FIG. 5, the winding angle of the kneading tool 111 decreases from the middle portion 123 of the tool down to the lower portion 125 of the tool.

Furthermore, the winding angle of the kneading tool 111 is also decreasing over the middle portion 123 of the tool, the section I of the middle portion 123 having an angle equal to 73°, the section II of the middle portion 123 having an angle equal to 53° and the section III of the middle portion 123 having an angle equal to 42°.

Regardless of the retained winding values and as represented in FIG. 5, the winding angle of the lower portion 125 of the kneading tool is smaller than or equal to half the smallest angle winding value of the middle portion 123. This allows obtaining a tool relatively barely wound on the lower portion of the tool, this enabling the tool to collect the ingredients which tend to accumulate in the bottom of the vessel of the kneading device.

Reference is made to FIG. 6 illustrating the kneading member 107 of the invention in side view.

As discussed above, the height H of the kneading tool 111 is defined as being the distance measured between the reference plane P containing the upper wall 117 of the mounting roller 109 and a plane P' parallel to said reference plane and passing through the lower edge 119 of the kneading tool 111.

The height H of the kneading tool is for example equal to 477.50 millimeters.

Nonetheless, regardless of the retained height H of the kneading tool 111, the upper 121 and middle 123 portions of the kneading tool 111 extend over a height comprised between about 70% and about 75% of the total height H of the tool 111, and the lower portion 125 of the tool 111 extends over a height comprised between about 25% and about 30% of the total height H of the tool 111.

In FIGS. 5 and 6, the kneading member split into 5 sections A to E is represented. Referring to FIGS. 5 and 6, the winding angles of the kneading tool are defined by the following values:

Section A: 33° over a height of the tool equal to 43 millimeters, said height being measured between the reference plane P containing the upper wall 117 of the mounting roller 109 and a plane $P_A$ parallel to said reference plane and offset by 43 millimeters relative to said reference plane towards the lower edge 119 of the tool 111, Section B: 73° over a height of the tool equal to 107 millimeters, said height being measured between the plane $P_A$ parallel to said reference plane P and offset by 43 millimeters relative to said reference plane P towards the lower edge 119 of the tool 111 and a plane $P_B$ parallel to said reference plane P and offset by 150 millimeters relative to said reference plane P towards the lower edge 119 of the tool 111, Section C: 53° over a height of the tool equal to 100 millimeters, said height being measured between the plane $P_B$ parallel to said reference plane and offset by 150 millimeters relative to said reference plane P towards the lower edge 119 of the kneading tool 111 and a plane $P_C$ parallel to said reference plane P and offset by 250 millimeters relative to said reference plane P towards the lower edge 119 of the tool 111, Section D: 42° over a height of the tool equal to 100 millimeters, said height being measured between the plane $P_C$ parallel to said reference plane P and offset by 250 millimeters relative to said reference plane P towards the lower edge 119 of the kneading tool 111 and a plane $P_D$ parallel to said reference plane P and offset by 350 millimeters relative to said reference plane P towards the lower edge 119 of the tool 111, Section E: 19° over a height of the tool equal to 127.50 millimeters, said height being measured between the plane $P_D$ parallel to said reference plane P and offset by 350 millimeters relative to said reference plane P towards the lower edge 119 of the kneading tool 111 and the plane P' parallel to said reference plane and offset by 477.50 millimeters relative to said reference plane P, passing through the lower edge 119 of the kneading tool 111.

The kneading member of the present invention allows obtaining a good tradeoff between the quality of mixing of the ingredients that compose the dough and the texturing of the dough.

This tradeoff is obtained thanks to the particular geometry of the kneading tool of the invention, which provides for a winding angle of the lower portion of the tool smaller than that of the middle portion of the kneading tool.

It goes without saying that the present invention is not limited to the only embodiments of the kneading member and of this kneading device. Indeed, the angle values given in the present description as well as the different dimensions of the kneading member have been provided above only as illustrative examples. The present invention encompasses all variants involving the technical equivalents of the described means as well as their combinations if these fall within the scope of the invention.

The invention claimed is:

1. A kneading member for a kneading device for kneading a dough, said kneading member comprising:
    a mounting roller, adapted to be rotated via a motor of the kneading device;
    a kneading tool, intended to be at least partially immersed in a mixing and kneading vessel of the kneading device and designed to mix ingredients that constitute the dough, said kneading tool comprising:
    an upper portion, extending from said mounting roller,
    a middle portion, in continuation of the upper portion, and
    a lower portion, in continuation of the middle portion, one end of which forms a lower edge of the kneading tool,
    wherein the kneading tool is formed by a circular helix blade which winding angle is not constant at least between the upper, middle and lower portions of said kneading tool, and wherein the winding angle of the lower portion of the kneading tool is smaller than that of the middle portion of the kneading tool, the winding angle of the kneading tool being defined by the angle formed by the kneading tool about an axis of rotation of the kneading member, between an upper edge at the end of the upper portion of the tool and the lower edge, wherein a value of the winding angle formed by the upper and middle portions of the kneading tool is comprised between about 85% and about 95% of the value of the total winding angle of the kneading tool, and wherein the value of the winding angle formed by the lower portion of the kneading tool is comprised between about 5% and about 15% of the value of the total winding angle of the kneading tool, and
    wherein the upper and middle portions of the kneading tool extend over a height comprised between about 70% and about 75% of the total height of the kneading tool, and wherein the lower portion of the kneading tool extends over a height comprised between about 25% and about 30% of the total height of the kneading tool, said total height of the kneading tool being measured between a reference plane containing an upper wall of the mounting roller and a plane parallel to said reference plane and containing the lower edge of the kneading tool.

2. The kneading member according to claim 1, wherein that the winding angle of the kneading tool decreases from the middle portion of the kneading tool down to the lower portion of the kneading tool.

3. The kneading member according to claim 2, wherein the winding angle of the upper portion of the kneading tool and the winding angle of the lower portion of said tool are constant, and in that the winding angle of the middle portion of said tool is not constant.

4. The kneading member according to claim 3, wherein the winding angle of the kneading tool is decreasing over the middle portion of the kneading tool.

5. The kneading member according to claim 4, wherein the winding angle of the lower portion of the kneading tool is smaller than or equal to half a smallest winding angle value of the middle portion of the kneading tool.

6. The kneading member according to claim 5, wherein the winding angle of the kneading tool is larger than or equal to 220°.

7. The kneading member according to claim 6, wherein the winding angle of the lower portion of the kneading tool is comprised between about 15° and about 25°.

8. The kneading member according to claim 7, wherein the total winding angle of the upper portion of the kneading tool and the middle portion of the kneading tool is comprised between about 195° and about 205°.

9. The kneading member according to claim 1, wherein the winding angle of the upper portion of the kneading tool and the winding angle of the lower portion of said tool are constant, and in that the winding angle of the middle portion of said tool is not constant.

10. The kneading member according to claim 1, wherein the winding angle of the kneading tool is decreasing over the middle portion of the kneading tool.

11. The kneading member according to claim 10, wherein the winding angle of the lower portion of the kneading tool is smaller than or equal to half a smallest winding angle value of the middle portion of the kneading tool.

12. The kneading member according to claim 1, wherein the winding angle of the kneading tool is larger than or equal to 220°.

13. The kneading member according to claim 1, wherein the winding angle of the lower portion of the kneading tool is comprised between about 15° and about 25°.

14. The kneading member according to claim 1, wherein the total winding angle of the upper portion of the kneading tool and the middle portion of the kneading tool is comprised between about 195° and about 205°.

15. A kneading device for kneading a dough including a frame, the frame supporting:
    the mixing and kneading vessel,
    the motor, and at least one kneading member according to claim 1, rotated via said motor and which kneading tool of said kneading member is at least partially immersed in the mixing and kneading vessel.

\* \* \* \* \*